(12) United States Patent
Hong et al.

(10) Patent No.: US 12,315,908 B2
(45) Date of Patent: May 27, 2025

(54) APPARATUS FOR MANUFACTURING POSITIVE ELECTRODE FILM, MANUFACTURING METHOD USING SAME, AND POSITIVE ELECTRODE FILM MANUFACTURED USING SAME

(71) Applicant: LG Energy Solution, Ltd., Seoul (KR)

(72) Inventors: Kyungsik Hong, Daejeon (KR); Dong Hyeop Han, Daejeon (KR); Minsu Kim, Daejeon (KR); Dongseok Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 189 days.

(21) Appl. No.: 18/014,725

(22) PCT Filed: May 24, 2022

(86) PCT No.: PCT/KR2022/007372
§ 371 (c)(1),
(2) Date: Jan. 5, 2023

(87) PCT Pub. No.: WO2022/250427
PCT Pub. Date: Dec. 1, 2022

(65) Prior Publication Data
US 2023/0275206 A1 Aug. 31, 2023

(30) Foreign Application Priority Data

May 25, 2021 (KR) .................. 10-2021-0066777
May 24, 2022 (KR) .................. 10-2022-0063467

(51) Int. Cl.
*H01M 4/04* (2006.01)
*B29C 43/00* (2006.01)
(Continued)

(52) U.S. Cl.
CPC .......... *H01M 4/043* (2013.01); *B29C 43/006* (2013.01); *H01M 4/0433* (2013.01);
(Continued)

(58) Field of Classification Search
CPC ............ B29C 43/006; B29C 2043/046; B29C 64/214; H01M 4/043; H01M 4/0433; H01M 10/0404; H01M 10/0585; H01M 4/139
See application file for complete search history.

(56) References Cited

U.S. PATENT DOCUMENTS

| 4,833,048 A | 5/1989 | Dejonghe et al. |
| 2012/0119158 A1 | 5/2012 | Barchasz et al. |

(Continued)

FOREIGN PATENT DOCUMENTS

| CN | 109873120 A | 6/2019 |
| JP | S57145270 | 9/1982 |

(Continued)

OTHER PUBLICATIONS

Translation of WO-2005060033-A1 (Year: 2005).*

(Continued)

*Primary Examiner* — John J DeRusso
(74) *Attorney, Agent, or Firm* — Bryan Cave Leighton Paisner LLP

(57) ABSTRACT

An apparatus for manufacturing a positive electrode film and a manufacturing method using the same are provided. The apparatus includes a feeding part supplying a positive electrode material in a powder state to an upper surface of a mold conveyed by conveying means, a flattening part flattening the positive electrode material in a powder state supplied to the upper surface of the mold, a forming part applying pressure from an upper direction to the positive electrode material that has passed through the flattening part; and a (Continued)

conveying part comprising the conveying means sequentially conveying the mold to the feeding part, the flattening part, and the forming part.

12 Claims, 2 Drawing Sheets

(51) Int. Cl.
    *B29C 43/04* (2006.01)
    *H01M 4/139* (2010.01)
    *H01M 10/04* (2006.01)
    *H01M 10/0585* (2010.01)
(52) U.S. Cl.
    CPC ....... *H01M 4/139* (2013.01); *H01M 10/0404* (2013.01); *H01M 10/0585* (2013.01); *B29C 2043/046* (2013.01)

(56) References Cited

U.S. PATENT DOCUMENTS

| | | |
|---|---|---|
| 2013/0119321 A1 | 5/2013 | Lettow |
| 2014/0099538 A1 | 4/2014 | Johnson et al. |
| 2015/0010825 A1 | 1/2015 | Yang et al. |
| 2015/0340688 A1 | 11/2015 | Rhee et al. |
| 2017/0214034 A1* | 7/2017 | Ota .................. H01G 11/86 |
| 2017/0352874 A1 | 12/2017 | Hosono et al. |
| 2018/0212252 A1 | 7/2018 | Dillard et al. |
| 2018/0301737 A1 | 10/2018 | Lee |
| 2019/0097207 A1* | 3/2019 | Enokihara .......... H01M 4/0404 |
| 2019/0123377 A1 | 4/2019 | Yang et al. |
| 2019/0176233 A1* | 6/2019 | Varetti ................ B29C 64/153 |
| 2020/0099104 A1 | 3/2020 | Watanabe et al. |
| 2020/0343525 A1 | 10/2020 | Hu et al. |
| 2020/0350564 A1 | 11/2020 | Sun et al. |
| 2021/0057735 A1 | 2/2021 | Kim et al. |
| 2021/0242463 A1 | 8/2021 | Kim et al. |
| 2021/0320288 A1 | 10/2021 | Althues et al. |

FOREIGN PATENT DOCUMENTS

| | | |
|---|---|---|
| JP | H05205742 | 8/1993 |
| JP | H09-147868 A | 6/1997 |
| JP | 2005-335203 A | 12/2005 |
| JP | 2007-005747 A | 1/2007 |
| JP | 2010109354 | 5/2010 |
| JP | 2012-146395 A | 8/2012 |
| JP | 2012533862 | 12/2012 |
| JP | 5293383 B2 | 9/2013 |
| JP | 2016071956 | 5/2016 |
| JP | 2017-098138 A | 6/2017 |
| JP | 2019-129075 A | 8/2019 |
| JP | 2020053172 | 4/2020 |
| KR | 10-1999-0085953 A | 12/1999 |
| KR | 10-2001-0107374 A | 12/2001 |
| KR | 10-0463437 B1 | 12/2004 |
| KR | 10-2005-0052258 A | 6/2005 |
| KR | 10-1181303 B1 | 9/2012 |
| KR | 10-2013-0125919 A | 11/2013 |
| KR | 10-1379716 B1 | 3/2014 |
| KR | 10-2014-0058508 A | 5/2014 |
| KR | 10-2014-0084840 A | 7/2014 |
| KR | 10-2014-0091293 A | 7/2014 |
| KR | 10-2015-0026098 A | 3/2015 |
| KR | 10-2015-0067237 A | 6/2015 |
| KR | 10-2015-0135961 A | 12/2015 |
| KR | 10-2016-0031287 A | 3/2016 |
| KR | 10-2016-0051610 A | 5/2016 |
| KR | 10-2016-0144756 A | 12/2016 |
| KR | 10-2017-0025760 A | 3/2017 |
| KR | 10-2017-0057953 A | 5/2017 |
| KR | 10-1745974 B1 | 6/2017 |
| KR | 10-2017-0086118 A | 7/2017 |
| KR | 10-2018-0102406 A | 9/2018 |
| KR | 10-2019-0026626 A | 3/2019 |
| KR | 10-2019-0100152 A | 8/2019 |
| KR | 10-2020-0003575 A | 1/2020 |
| KR | 10-2020-0017340 A | 2/2020 |
| KR | 10-2140804 B1 | 8/2020 |
| WO | WO-2005060033 A1 * | 6/2005 ........... B29C 43/006 |
| WO | 2013-005135 A1 | 1/2013 |
| WO | 2018-210723 A1 | 11/2018 |

OTHER PUBLICATIONS

Caitlin Dillard et al., "Binder-free, freestanding cathodes fabricated with an ultra-rapid diffusion of sulfur into carbon nanofiber mat for lithiume-sulfur batteries", Materials Today Energy 9 (2018) pp. 336-344.

* cited by examiner

A

B

APPARATUS FOR MANUFACTURING POSITIVE ELECTRODE FILM, MANUFACTURING METHOD USING SAME, AND POSITIVE ELECTRODE FILM MANUFACTURED USING SAME

CROSS-REFERENCE TO RELATED APPLICATION(S)

This application is a National Stage Application of International Application No. PCT/KR2022/007372, filed on May 24, 2022, which claims priority to Korean Patent Application No. 10-2021-0066777 filed on May 25, 2021 and Korean Patent Application No. 10-2022-0063467 filed on May 24, 2022, the disclosures of which are incorporated herein by reference in their entireties.

FIELD OF DISCLOSURE

The present disclosure relates to an apparatus for manufacturing a positive electrode film, a manufacturing method thereof, and a lithium secondary battery, a battery module, and a battery pack.

BACKGROUND

Recently, with the rapid development in the field of electronic devices and electric vehicles, the demand for secondary batteries is increasing. In particular, with the trend toward miniaturization and weight reduction of portable electronic devices, there is a growing demand for secondary batteries having a high energy density that can cope with them.

Among the secondary batteries, a lithium-sulfur secondary battery is a secondary battery that uses sulfur-based compounds having a sulfur-sulfur bond as a positive electrode active material, and uses alkali metals such as lithium, carbon-based materials in which intercalation and deintercalation of metal ions such as lithium ions occur, or silicon or tin, which forms an alloy with lithium, as a negative electrode active material. Specifically, in the case of the lithium-sulfur secondary battery, during the discharging which is a reduction reaction, as the sulfur-sulfur bond is cut off, the oxidation number of sulfur decreases, and during the charging which is an oxidation reaction, as the oxidation number of sulfur increases, the sulfur-sulfur bond is re-formed. Through this oxidation-reduction reaction, electrical energy is stored and generated.

In particular, in the case of lithium-sulfur secondary batteries, sulfur used as a positive electrode active material has a theoretical energy density of 1,675 mAh/g, which is about five times higher than the positive electrode active material used in conventional lithium secondary batteries, and thus they are batteries capable of expressing high power and high energy density. In addition, since sulfur has the advantage of being cheap, and rich in resources and thus being readily available and environmentally friendly, sulfur is drawing attention as an energy source not only for portable electronic devices but also for medium- and large-devices such as electric vehicles.

Since sulfur has an electrical conductivity of $5\times10^{-30}$ S/cm, which is a nonconductor without electrical conductivity, there is a problem that the movement of electrons generated by the electrochemical reaction is difficult. Accordingly, sulfur is compounded with an electrically conductive material such as carbon that can provide an electrochemical reaction site, and the sulfur-carbon composite produced thereby is used.

In order to use the sulfur-carbon composite as a positive electrode active material, a slurry coating method of preparing a slurry together with an electrically conductive material and a binder, and then, applying the slurry to a current collector, that is, a method of manufacturing a positive electrode through a wet process is generally used.

However, the positive electrode manufactured by such a wet process has a problem that the loading amount of the positive electrode active material in the positive electrode is lowered due to the electrically conductive material and the binder used in the preparation of the slurry, and thus the energy density is also reduced. In addition, when the positive electrode is manufactured by a wet process, there is a problem that additional costs are incurred due to mixing, coating, and drying processes, in addition to the problem of moisture remaining in the positive electrode.

On the other hand, when a positive electrode is manufactured by a dry process, the type and content of a usable binder is limited because fiberization of the binder must be essentially made. In addition, for this purpose, since the pre-mixing process of the positive electrode active material, the electrically conductive material, and the binder and the milling process in which a high shear force is applied for the fiberization of the binder are involved, there is a problem that the process is complicated and the cost and time are increased. In addition, there is a problem that the positive electrode active material and the electrically conductive material may be crushed by the high energy applied in the fiberizing process of the binder.

Accordingly, it is necessary to develop a technology capable of manufacturing a high-loading large-area positive electrode for a lithium secondary battery through a dry process.

RELATED ARTS

Chinese Patent Application Publication No. 109873120 published on Jun. 11, 2019.

US Patent Application Publication No. 2018-0212252 published on Jul. 26, 2018.

SUMMARY

Accordingly, the inventors of the present disclosure have conducted various studies to solve the above problems, and as a result, have confirmed that in an apparatus for manufacturing a positive electrode film through a dry process, a positive electrode film having a high loading and a large area can be easily manufactured by configuring it to include a flattening part for flattening the positive electrode material in a powder state, and thus completed the present disclosure.

Therefore, it is an object of the present disclosure to provide a manufacturing apparatus and a manufacturing method for a positive electrode film having a uniform loading amount of a positive electrode active material and a large area.

In addition, it is another object of the present disclosure to provide a positive electrode film manufactured according to the manufacturing apparatus and manufacturing method described above.

In addition, it is still another object of the present disclosure to provide a lithium secondary battery including the positive electrode film.

In order to achieve the above objects, the present disclosure provides an apparatus for manufacturing the positive electrode film, which comprises a feeding part for supplying a positive electrode material in a powder state to the upper surface of a mold conveyed by conveying means; a flattening part for uniformly flattening the positive electrode material supplied to the upper surface of the mold; a forming part for applying pressure from an upper direction to the positive electrode material that has passed through the flattening part; and a conveying part comprising conveying means for sequentially conveying the mold to the feeding part, the flattening part, and the forming part.

In addition, the present disclosure provides a method for manufacturing a positive electrode film using the apparatus for manufacturing the positive electrode film, which comprises the steps of (a) supplying a positive electrode material in a powder state to the upper surface of the mold conveyed by a conveying means; (b) flattening the upper surface of the positive electrode material supplied to the upper surface of the mold using a flattening part; and (c) applying pressure to the positive electrode material flattened through step (b) from the upper direction using a forming part.

In addition, the present disclosure provides a positive electrode film manufactured by the manufacturing apparatus and manufacturing method of the positive electrode film.

In addition, the present disclosure provides a lithium secondary battery comprising the positive electrode film.

In addition, the present disclosure provides a battery module comprising the lithium secondary battery as a unit cell.

In addition, the present disclosure provides a battery pack comprising the battery module.

In the apparatus for manufacturing the positive electrode film according to the present disclosure, a dry process using a positive electrode material in a powder state is applied instead of a wet process, and thus there is no problem with the wet process. In addition, by introducing the step of flattening the positive electrode material in the powder state through the flattening part, it is not only easy to control the loading amount of the finally manufactured positive electrode, but also its precision is excellent. In addition, a large-area positive electrode film can be easily manufactured in a continuous process, thereby improving productivity and enabling mass production.

DETAILED DESCRIPTION

Figure 1:
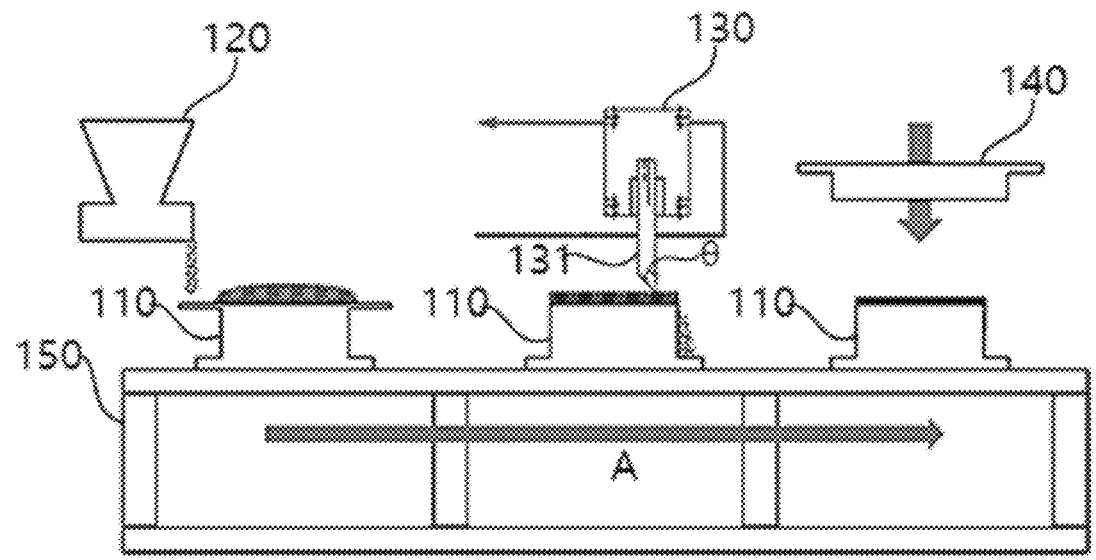
FIG. 1 is a diagram schematically illustrating the configuration of an apparatus for manufacturing the positive electrode film according to an embodiment of the present disclosure.

Hereinafter, preferred embodiments of the present disclosure will be described in detail with reference to the accompanying drawings. Prior to describing the present disclosure, if it is determined that detailed descriptions of related well-known functions and configurations may unnecessarily obscure the gist of the present disclosure, a description thereof will be omitted.

The description and drawings below illustrate specific embodiments to enable those skilled in the art to readily practice the described apparatus and method. Other embodiments may comprise other structural and logical modifications. Individual components and functions may generally be selected, unless expressly required, and the order of the processes may vary. Portions and features of some embodiments may be comprised in or substituted for other embodiments The terms and words used in the present specification and claims should not be construed as limited to ordinary or dictionary terms, and should be construed in a sense and concept consistent with the technical idea of the present disclosure, based on the principle that the inventor can properly define the concept of a term to describe his invention in the best way possible.

The terminology used herein is for the purpose of describing particular embodiments only and is not intended to be limiting of the present disclosure. The singular forms "a," "an" and "the" comprise plural referents unless the context clearly dictates otherwise. It is to be understood that the terms "comprise", or "have", etc., as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

The term "composite" as used herein refers to a material that two or more materials are combined to express a more effective function while forming physically and chemically different phases to each other.

As used herein, the term "free-standing film" refers to a film capable of maintaining the shape of a film by itself without a separate support at room temperature and atmospheric pressure.

The lithium-sulfur battery has higher theoretical discharging capacity and theoretical energy density than other various secondary batteries, and is attracting attention as a next-generation secondary battery due to the advantage that sulfur, which is used as a positive electrode active material, is rich in resources and thus is cheap and environmentally friendly.

In this lithium-sulfur battery, the positive electrode was manufactured through a wet process in which a slurry containing a positive electrode active material, an electrically conductive material, a binder, etc. was applied to a positive electrode current collector.

However, since the slurry used for manufacturing the positive electrode essentially contains other materials such as an electrically conductive material and a binder as well as the positive electrode active material, there is a limitation in the loading amount of the positive electrode active material, and thus the energy density is lowered. In addition, among the electrically conductive material and the binder generally used for improving the conductivity of the positive electrode and imparting adhesion, in particular, the binder acts as a resistive element, thereby further reducing the energy density of the battery. In addition, in the case of the wet process using the slurry, since a series of detailed processes such as mixing, coating, and drying of the components of the slurry are performed, there is a problem that not only the process is complicated, but also it is very wasteful in terms of time and cost.

In order to solve this problem, in the prior art, a dry process using binder fiberization was used, but not only there are restrictions on changing the type and content of the binder, but also there is a disadvantage that the positive electrode active material and the electrically conductive material are damaged, the process takes a lot of time and money, and it is difficult to increase the area.

Therefore, the present disclosure provides a manufacturing apparatus and a manufacturing method for the positive electrode film, which is easy to manufacture a large-area positive electrode while having a high sulfur loading amount compared to a conventional positive electrode, by using a dry process using positive electrode material powder for forming the film instead of a wet process using a slurry, and introducing a flattening part for flattening a positive electrode material in a powder state.

As the positive electrode material powder for forming the film, a positive electrode material powder for forming a free-standing film may be used.

FIG. 1 is a diagram schematically illustrating a configuration of the apparatus for manufacturing the positive electrode film according to an embodiment of the present disclosure.

Specifically, referring to FIG. 1, the apparatus 100 for manufacturing the positive electrode film according to an embodiment of the present disclosure comprises the feeding part 120 for supplying a positive electrode material in a powder state to the upper surface of the mold conveyed by the conveying means 110; the flattening part 130 for uniformly flattening the positive electrode material supplied to the upper surface of the mold; the forming part 140 for applying pressure from an upper direction to the positive electrode material that has passed through the flattening part 130; and the conveying part 150 comprising conveying means 110 for sequentially conveying the mold to the feeding part 120, the flattening part 130, and the forming part 140.

As shown in FIG. 1, the apparatus 100 for manufacturing the positive electrode film according to an embodiment of the present disclosure comprises the conveying part 150 that processes each step as a continuous process, by sequentially connecting the feeding part 120, the flattening part 130, and the forming part 140, and thus can improve the productivity.

The conveying means 110 is for conveying the positive electrode material in a powder state along a predetermined conveying path, and is disposed on a conveying path formed in the conveying part 150. Although the conveying means 110 is described with a rectangular plate as an example in FIG. 1, the conveying means is not limited thereto and may have various shapes.

The conveying means 110 may comprise a mold on its upper surface. The mold can accommodate the positive electrode material for forming the film, which is a positive electrode active material, in the concave part, and can be an ordinary mold made of a material that does not deform even when pressure is applied. In the present disclosure, the mold may be a mold in which a concave part (or the receiving part of the positive electrode active material) conforming to the specifications of the positive electrode for the purpose of the present disclosure is formed.

In the present disclosure, the positive electrode material in a powder state may comprise a sulfur-carbon composite composed of 50% by weight to 90% by weight of sulfur and 10% by weight to 50% by weight of a porous carbon material.

In addition, the positive electrode material in a powder state may contain sulfur-carbon composite in an amount of 90 to 100% by weight, preferably 95 to 100% by weight, and more preferably 97 to 100% by weight, based on the total weight of the positive electrode material.

The sulfur-carbon composite refers to a form in which the sulfur is supported in the porous carbon material. For example, the sulfur-carbon composite may be in a state where sulfur is attached or coated to the surface of the porous carbon material. Also, the sulfur-carbon composite may be in a state in which the sulfur is attached, filled, or coated to the internal pores of the porous carbon material; or in a state in which the sulfur penetrates and is attached to the inside of the porous carbon material.

The positive electrode material is for forming a film, and the positive electrode film material itself can be used as a positive electrode material even without the process of applying it to the current collector. The positive electrode film material may be a free-standing film positive electrode material.

The positive electrode material in a powder state may contain a minimum amount of binder if necessary to further improve the physical properties of the positive electrode. In this case, the binder may be used without limitation as long as it is commonly used in the art. In addition, the positive electrode material in a powder state may contain the binder in an amount of 0 to 10% by weight, 0 to 5% by weight, 0 to 3% by weight, 0 to 2% by weight, or 0 to 1% by weight, based on the total weight of the positive electrode material.

The positive electrode material in a powder state may be in a binder- and electrically conductive material-free form which does not contain the binder and the electrically conductive material. As such, if the positive electrode material in a powder state does not contain the binder and the electrically conductive material, it is possible to fundamentally prevent the problem of reducing the energy density of the battery due to the binder resistance, and the problem of lowering the formability due to the electrically conductive material lacking cohesive force.

The positive electrode material in a powder state may be connected by sulfur formed on the surface of the porous carbon material to form a film shape, in a state in which the porous carbon material forms a skeleton of the positive electrode material.

In addition, the positive electrode material in a powder state may have 10 gf/cm or more of an internal adhesive force of the positive electrode film after molding by pressure to be described later. The internal adhesive force is due to the property that sulfur is melted and aggregated with surrounding sulfur during the pressing process, and if the internal adhesive force of the positive electrode material is less than 10 gf/cm, molding into a film may be difficult due to insufficient adhesion. Specifically, the internal adhesive force may be 10 gf/cm or more, 15 gf/cm or more, 20 gf/cm or more, 25 gf/cm or more, 30 gf/cm or more, or 35 gf/cm or more. In addition, the upper limit of the adhesive force may be 50 gf/cm or less, 60 gf/cm or less, 70 gf/cm or less, 80 gf/cm or less, 90 gf/cm or less, or 100 gf/cm or less, but is not limited thereto. As the internal adhesive force of the positive electrode material is increased, it can be good in terms of the formability, the durability, and the performance of the battery.

In the present disclosure, the sulfur may be at least one selected from the group consisting of inorganic sulfur ($S_8$), $Li_2S_n$ (n≥1, n is an integer), an organic sulfur compound, and a carbon-sulfur polymer (($C_2S_x)_n$, 2.5≤x≤50, n≥2, x and n are an integer).

In addition, the sulfur may be contained in an amount of 50% by weight or more, 55% by weight or more, or 60% by weight or more, and may be contained in an amount of 80% by weight or less, 85% by weight or less, or 90% by weight or less, based on the total weight of the sulfur-carbon composite. If the sulfur is contained in an amount of less than 50% by weight, as the ratio of sulfur, which is an electrochemically active material, is decreased, the sulfur coating layer formed on the surface of the porous carbon material becomes thinner, making it difficult to form a sulfur-carbon composite properly, or the amount of sulfur contained in the interior of the porous carbon material may be reduced, thereby reducing the capacity of the battery. In addition, if the sulfur is contained in an amount exceeding 90% by weight, the sulfur, which is non-conductive, blocks the conductive structure of the porous carbon material to block electrochemical activity, and thus limiting the operation of the battery.

In the sulfur-carbon composite, when the sulfur is incorporated in an amount of 50% by weight to 90% by weight, the sulfur is supported on the surface and/or pores of the porous carbon material in a form that is appropriately attached, coated, or filled, so that a positive electrode in the form of a film (e.g., in the form of free-standing film) can be stably formed.

In the present disclosure, the porous carbon material may have a structure in which pores or hollows are formed, or may be a porous carbon material having a high specific surface area, and any one commonly used in the art may be used.

The porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF); and activated carbon. Preferably, the porous carbon material may be carbon nanotubes.

The carbon nanotubes may have more connection points due to structural features, which may be more advantageous when forming a film. Specifically, since the carbon nanotubes have a shape having an aspect ratio exceeding 1, they may be advantageously connected to each other to form a film.

In addition, the graphene refers to the form of a single layer in which carbon atoms are arranged in a honeycomb shape in two dimensions, and is a material that has a thin, wide cross-sectional area and excellent conduction properties, and exhibits excellent physical properties such as bending properties and high sensitivity to light. In the present disclosure, graphene comprises all of reduced graphene formed by reducing graphene oxide, physically exfoliated graphene and the like. The graphene thin film may be comprised in a form surrounding the outer surface of the carbon nanotube, and may suppress the leaching of sulfur into the electrolyte solution during operation of the battery while reinforcing the electrical conduction path.

In addition, the content of the porous carbon material may be 10% by weight or more, 15% by weight or more, 20% by weight or more or 5% by weight or more, and may be 40% by weight or less, 45% by weight or less or 50% by weight or less, based on the total weight of the sulfur-carbon composite. If the porous carbon material is less than 10% by weight, the surface area and space for sulfur to be filled, attached, or coated may not be sufficiently provided, so that the electrochemical availability (reactivity) of sulfur may be reduced. If the porous carbon material exceeds 50% by weight, the content of sulfur is relatively lowered, so that when applied to a lithium secondary battery, the energy density of the battery may be excessively reduced.

The feeding part 120 is for supplying the positive electrode material in a powder state to the upper surface of the mold conveyed by the conveying means 110, and is not particularly limited in its configuration, apparatus, and the like. For example, the feeding part 120 may include an ultrasonic sieve machine, a vibratory feeder, etc. to remove coarse particles from the positive electrode material in a powder state.

The flattening part 130 removes excess positive electrode material exceeding a desired loading amount (target loading amount) by uniformly flattening the positive electrode material supplied to the upper surface of the mold from the feeding part 120.

In particular, the apparatus for manufacturing the positive electrode film 100 of the present disclosure can easily adjust the loading amount of the positive electrode material in a powder state according to the purpose through the flattening part 130, as well as improve the deviation of the loading amount, so that the loading amount of the positive electrode finally manufactured can be easily adjusted according to the use, and improve the reliability of the manufacturing process.

The flattening part 130 is not particularly limited in its configuration, apparatus, and the like as long as it is possible to flatten the upper surface of the positive electrode material supplied to the upper surface of the mold that is conveyed by the conveying means 110. For example, the flattening part 130 is composed of a scraping blade 131 for scraping the upper surface of the positive electrode material in a powder state and two axes (y, z), in order to remove excess positive electrode material exceeding a desired loading amount in the positive electrode material supplied to the upper surface of the mold, and thus may comprise a linear stage for adjusting the position of the scraping blade 131.

The scraping blade 131 flattens the upper surface of the positive electrode material being conveyed, while the scraping blade being in a fixed state, or flattens the upper surface of the positive electrode material while the scraping blade reciprocating once or more in a direction opposite to a conveying direction and in the conveying direction.

The scraping blade 131 may comprise a first scraping blade for flattening an upper surface of the positive electrode material in the direction opposite to the conveying direction, or flattening by reciprocating in the direction opposite to the conveying direction and the conveying direction once or more; and a second scraping blade for flattening once in a direction different from the conveying direction and the direction opposite to the conveying direction, or flattening by reciprocating twice or more. In this case, the direction different from the conveying direction and the direction opposite to the conveying direction refers to the direction at an angle of 90° to the conveying direction and the direction opposite to the conveying direction.

Figure 2:
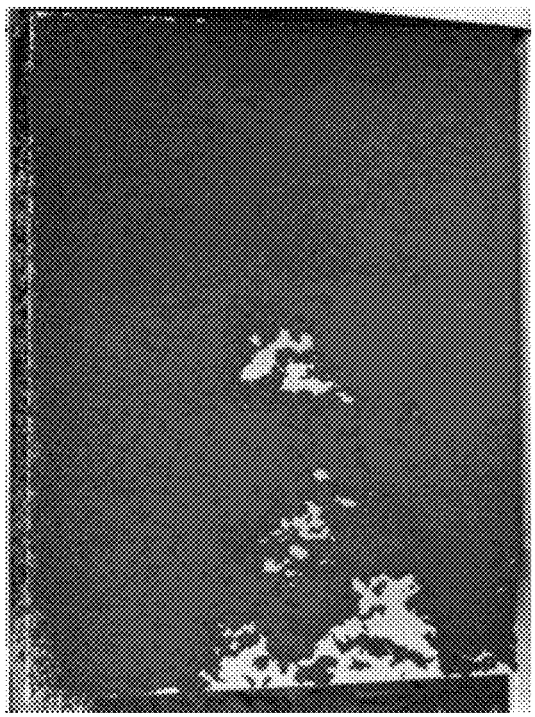
FIG. 2 is a photograph showing a case in which a large amount of positive electrode material is removed at once by a scraping blade included in a flattening part in the apparatus for manufacturing the positive electrode film according to an embodiment of the present disclosure.

However, if the flattening is performed by reciprocating the scraping blade 131 two or more times, it is preferable that the flattening is performed while gradually lowering the height of the scraping blade 131 starting from a thickness higher than the thickness of the target positive electrode. In the flattening process, if too much powder (that is, positive electrode material) is removed with a scraping blade at one time, since there is a problem that the powder (target loading amount) that must remain on the upper surface of the mold is pulled together by the weight of the powder to be removed, as shown in FIG. 2, and thus the filling cannot be maintained uniformly, it is desirable that the flattening be carried out in several divided steps.

The flattening part 130 may control the loading amount of the positive electrode material by adjusting the height or angle (θ) of the tip of the blade of the scraping blade 131. The height of the tip of the blade of the scraping blade 131 may be determined in consideration of the thickness of the positive electrode film to be manufactured or a desired loading amount. For example, the height of the tip of the blade of the scraping blade 131 may be in the range of 200 to 1500 μm, and preferably 300 to 800 μm, based on the upper surface of the conveying means 110. In addition, the angle (θ) of the tip of the blade of the scraping blade 131 may be in the range of 45 to 90°, and preferably 70 to 90°. If the height or the angle (θ) of the tip of the blade of the scraping blade 131 is out of the above range, the surface of the positive electrode material in a powder state is not sufficiently flattened, and thus loading amount is non-uniform or the surface becomes rough.

The forming part 140 is for applying pressure from an upper direction to the positive electrode material that has passed through the flattening part 130, and is not particularly limited in its configuration, apparatus, and the like. For example, the forming part 140 may comprise a pressure plate.

The conveying part 150 is not particularly limited in its configuration, device, and the like as long as it supports the conveying means 110 and the mold, forms a conveying path for conveying the conveying means 110 in a certain direction, for example, in the direction of arrow A, and allows the conveying means 110 to sequentially pass through the feeding part 120, the flattening part 130, and the forming part 140 at a constant speed under the control of the driving unit. For example, the conveying part 150 may include a conveying device such as a conveyor belt.

In the present disclosure, the positive electrode film may mean a free-standing positive electrode film. The term "free-standing film" refers to a film capable of maintaining the shape of a film by itself without a separate support at room temperature and atmospheric pressure.

In addition, the present disclosure may provide a method for manufacturing a positive electrode film using the above-described apparatus for manufacturing the positive electrode film.

The method of manufacturing the positive electrode film according to an embodiment of the present disclosure comprises (a) supplying a positive electrode material in a powder state to the upper surface of the mold conveyed by a conveying means; (b) flattening the upper surface of the positive electrode material supplied to the upper surface of the mold using a flattening part; and (c) applying pressure to the positive electrode material flattened through step (b) from the upper direction using a forming part.

In particular, the method of manufacturing the positive electrode film of the present disclosure is by a dry process using the characteristics of the sulfur-carbon composite during pressurization as described above, and has the advantage that the mixing, coating, and drying processes of the components of the slurry performed in the existing wet process are omitted, and thus the problem due to the moisture remaining in the positive electrode as well as the problem of an increase in process cost do not occur. In addition, the method of the present disclosure introduces a step of flattening the positive electrode material in a powder state through a flattening part, and thus has the advantage that it is easy to control the loading amount of the positive electrode finally manufactured as well as its precision is excellent. In addition, the method for manufacturing a positive electrode film according to the present disclosure has an advantage of being able to independently and simply manufacture a large area positive electrode film by a series of continuous processes.

Hereinafter, a method of manufacturing the positive electrode film will be described in detail for each step.

First, step (a) is a step of supplying a positive electrode material in a powder state to the upper surface of the mold conveyed by a conveying means, wherein the positive electrode material in a powder state is applied to the upper surface of the mold from the feeding part. At this time, the feeding part and the positive electrode material in a powder state are the same as described above.

The positive electrode material in a powder state comprises a sulfur-carbon composite, and the sulfur-carbon composite may be prepared by a preparing method comprising the steps of mixing sulfur and a porous carbon material; and heat-treating the prepared mixture of sulfur and the porous carbon material.

In general, sulfur is melted on its surface under pressure conditions and exhibits a property of aggregating with surrounding sulfur, and thus it can be molded, but since sulfur is not flexible, sulfur alone cannot produce a positive electrode film material. In addition, since carbon has flexibility but lacks cohesive force, carbon does not undergo molding itself when pressed, so that a positive electrode film material cannot be prepared.

Meanwhile, the sulfur-carbon composite is a composite of sulfur and a porous carbon material, and sulfur is also present on the outer surface of the porous carbon material. Accordingly, when pressed, sulfur present on the outer surface of the porous carbon material is melted and exhibits a property of aggregating with the surrounding sulfur-carbon composite, thereby enabling molding. In addition, since the porous carbon material forming the skeleton in the sulfur-carbon composite is flexible, it is possible to form a positive electrode material in the form of a film, particularly a positive electrode material in the form of a free-standing film.

In order to prepare the positive electrode material in a powder state of the present disclosure comprising the sulfur-carbon composite, sulfur and a porous carbon material, which are raw materials for manufacturing the sulfur-carbon composite, are mixed to form a mixture of sulfur and the porous carbon material. In this case, the type and appropriate weight range of the sulfur and the porous carbon material are the same as described above.

Then, the mixture of sulfur and porous carbon material formed in the previous step is heat-treated to prepare a sulfur-carbon composite.

If the mixture of sulfur and porous carbon material is heated, sulfur is changed to a liquid state, and the sulfur in the liquid state enters the inside of the porous carbon material or is coated or adhered to its surface, and thus a sulfur-carbon composite in which sulfur is supported or filled and/or coated on the porous carbon material can be formed. For example, if the porous carbon material is a carbon nanotube, sulfur in a liquid state may be sucked into the carbon nanotube through a capillary phenomenon, and the sulfur may be supported on the carbon nanotube.

The heat treatment may be performed above the melting point of sulfur. For example, the heat treatment temperature may be 130 or more, 140 or more, or 150 or more, and 160 or less, 165 or less, or 170 or less. If the heat treatment temperature is less than 130° C., it may be difficult to form a composite supported or coated on the porous carbon material because sulfur does not melt. If the heat treatment temperature exceeds 170° C., a sulfur-carbon composite may be manufactured, but the volatilization of sulfur may occur, which may cause loss of sulfur and deterioration of the manufacturing equipment.

In addition, the heat treatment time is possible as long as it is an appropriate time for sulfur to be melted and supported on the porous carbon material by the heat treatment. The heat treatment time may be 25 minutes or more or 30 minutes or more, and may be 40 minutes or less, 45 minutes or less or 50 minutes or less.

The positive electrode material in a powder state may further include a binder other than the above-described sulfur-carbon composite if necessary, and the binder is added to and mixed with the positive electrode material containing the sulfur-carbon composite prepared as described above.

Next, step (b) above is a step of flattening the upper surface of the positive electrode material supplied to the upper surface of the mold using a flattening part, wherein the flattening part reciprocates one or more times between the direction opposite to the conveying direction and the conveying direction, and thus allows the positive electrode material to be uniformly applied to the upper surface of the mold.

Figure 3:
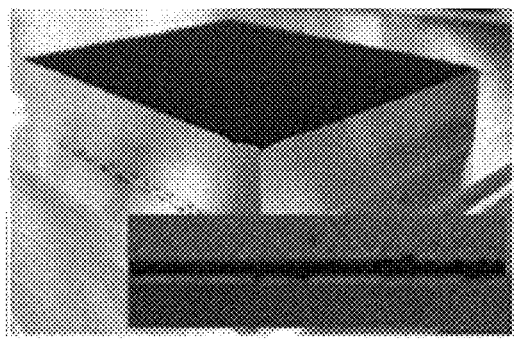
FIG. 3 is a side view of the positive electrode material when the flattening of step (b) in the method for manufacturing the positive electrode film according to an embodiment of the present disclosure is performed and when the step (b) is not performed (A: Example 1, B: Comparative Example 1).
Figure 3:
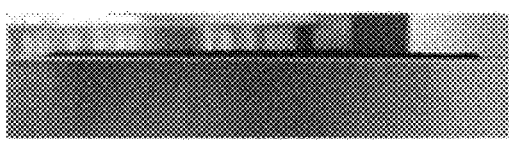
Figure 4:
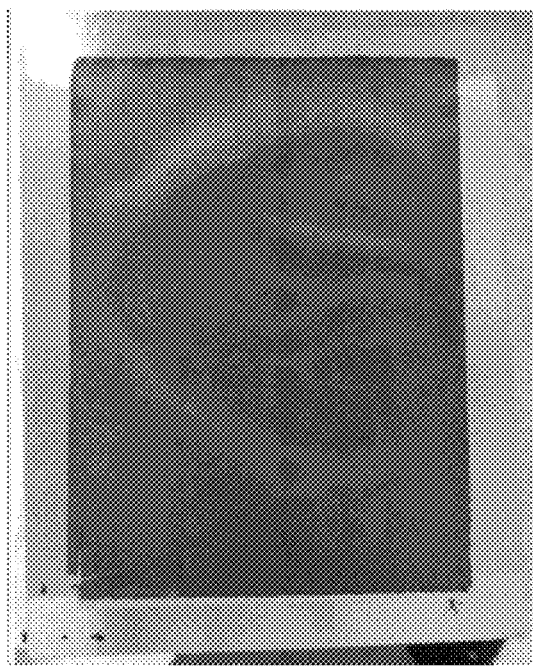
FIG. 4 is a photograph of the positive electrode film manufactured by the method according to the present disclosure.

FIG. 3 shows a photograph of the side of the positive electrode material depending on whether or not the flattening of step (b) in the method for manufacturing the positive electrode film according to an embodiment of the present disclosure is performed.

Referring to A of FIG. 3, it can be confirmed that through the flattening in step (b), the surface of the positive electrode material in a powder state supplied to the upper surface of the mold is uniformly formed. In particular, the photograph marked in red at the bottom of A of FIG. 3 is an enlarged side of the positive electrode material, showing that the positive electrode material has an even flatness through the flattening. On the other hand, B of FIG. 3 is a photograph of the surface of the positive electrode material when the flattening step is not progressed, which shows that the surface is not flat.

Step (b) is repeated while lowering the height until desired loading amount of the positive electrode material in a powder state is reached.

Next, step (c) above is a step of applying pressure to the positive electrode material flattened through step (b) from the upper direction using a forming part to manufacture a positive electrode film.

As described above, the sulfur-carbon composite has a characteristic of exhibiting strong self-cohesion in a pressurized state. Specifically, the sulfur on the surface of the sulfur-carbon composite is partially melted in a pressurized state to give connectivity between the composites, thereby exhibiting a strong self-cohesive force. Therefore, when pressure is applied to the sulfur-carbon composites in a particle state, cohesive force is generated between the particles, and also the carbon material functions as a skeleton and has flexibility by itself, and thus a positive electrode in the form of a film is formed. Also, it is possible to form a positive electrode in the form of a free-standing film depending on these physical properties.

The pressure in step (c) may be a pressure sufficient to form a film by sufficiently generating a cohesive force between the sulfur-carbon composites comprised in the positive electrode material. For example, the pressure during the pressurization may be 0.2 Mpa or more, and 2 Mpa or less or 5 Mpa or less. If the pressure at the time of pressurization is less than 0.2 Mpa, the cohesive force between the sulfur-carbon composites is weak, so that a film may not be formed. If the pressure exceeds 5 Mpa, the porosity of the positive electrode material is too low, and thus the structure of the positive electrode comprising it may be collapsed.

The time for applying the pressure in step (c) may be several seconds to several tens of seconds, preferably 1 to 10 seconds, and more preferably 3 to 10 seconds. In addition, since the porosity of the positive electrode film finally manufactured is determined depending on the pressure applied to the positive electrode material, the pressure may be different depending on the porosity of the positive electrode film to be manufactured.

During the pressurization of step (c), heating may also be performed. At this time, the conveying means 110 and/or the forming part 140 may be provided with a heater therein. As for the heater, a heater known in the art may be installed in a known form.

The positive electrode film manufactured by the manufacturing apparatus and manufacturing method of the present disclosure may have a porosity of 68% or less, 65% or less, 60% or less, 55% or less, and 45% or more, or 50% or more. If the porosity of the positive electrode film exceeds 68%, durability may be reduced. If the porosity of the positive electrode film is less than 45%, the space in which the electrochemical reaction occurs in the pores is narrowed, and thus it may be difficult to operate the battery normally.

Since the positive electrode film manufactured by the above-described manufacturing apparatus and manufacturing method is manufactured by a dry process using the positive electrode material in a powder state containing a sulfur-carbon composite, the positive electrode film according to the present disclosure has an advantage that the loading amount of sulfur, which is a positive electrode active material, is high. In addition, in the case of the dry process, a series of detailed processes such as mixing, coating, and drying of the components of the slurry required in the conventional wet process can be omitted, and thus it is possible to reduce the process cost, and there is no problem due to residual moisture. In addition, since the positive electrode film of the present disclosure manufactured by the dry process can be manufactured in a binder and electrically conductive material-free form which does not contain a binder and an electrically conductive material, it is possible to fundamentally eliminate the problem of deterioration in formability due to the electrically conductive material lacking cohesive force, in addition to the problem of deterioration of battery performance due to binder resistance. In addition, in the case of the present disclosure, since the step of flattening the positive electrode material in a powder state is included during manufacturing, a positive electrode film having a uniform loading amount and a large area can be easily manufactured, as shown in FIG. 3. In addition, in the case of the present disclosure, there is an advantage that the production process of the positive electrode film is performed as a continuous process, and thus the productivity is excellent.

In addition, the present disclosure provides a lithium secondary battery including a positive electrode film manufactured by the above-described manufacturing apparatus and manufacturing method.

The positive electrode film may be a free-standing film positive electrode.

The lithium secondary battery according to the present disclosure includes a positive electrode; a negative electrode; and an electrolyte interposed therebetween, wherein the positive electrode comprises the positive electrode film according to the present disclosure.

The positive electrode is manufactured by the above-described manufacturing apparatus and manufacturing method.

In particular, the positive electrode of the present disclosure can be loaded with a larger amount of sulfur than the conventional electrode, by including a positive electrode film material prepared by a dry process. Accordingly, in the present disclosure, the loading amount of sulfur in the positive electrode, that is, the loading amount of sulfur per unit area of the positive electrode active material layer in the positive electrode may be 3.0 to 5.0 mAh/cm$^2$. As such, with a high loading amount of sulfur, a lithium secondary battery comprising the positive electrode according to the present disclosure may exhibit excellent discharging capacity and lifetime characteristics.

The positive electrode may comprise a positive electrode current collector on at least one surface thereof.

The positive electrode current collector is for supporting the positive electrode active material, and is not particularly limited as long as it has high electrical conductivity without causing chemical changes in the battery. For example, copper, stainless steel, aluminum, nickel, titanium, palladium, sintered carbon; copper or stainless steel whose surface is treated with carbon, nickel, silver or the like; aluminum-cadmium alloy or the like may be used.

The positive electrode current collector can have minute irregularities formed on its surface to enhance the bonding force with the positive electrode active material, and may be formed in various forms such as film, sheet, foil, mesh, net, porous body, foam, nonwoven fabric or the like.

The negative electrode may be manufactured by forming a negative electrode active material layer containing the negative electrode active material on at least one surface of the negative electrode current collector, or may be a negative electrode active material layer (e.g., a lithium metal plate, a lithium metal thin film, or a lithium foil) alone.

The negative electrode current collector is for supporting the negative electrode active material, which is the same as described in the positive electrode current collector.

The negative electrode active material layer comprises a negative electrode active material, and may further comprise an electrically conductive material, a binder, etc.

The negative electrode active material may comprise a material capable of reversibly intercalating or de-intercalating lithium ion (Li$^+$), a material capable of reacting with lithium ion to reversibly form lithium containing compounds, lithium metal, or lithium alloy.

The material capable of reversibly intercalating or de-intercalating lithium ion (Li$^+$) may be, for example, crystalline carbon, amorphous carbon, or mixtures thereof. The material capable of reacting with lithium ion (Li$^+$) to reversibly form the lithium-containing compound may be, for example, tin oxide, titanium nitrate or silicon. In addition, the lithium alloy may be, for example, an alloy of lithium and the metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically may be in the form of a lithium metal thin film or lithium metal powder.

The method of forming the negative electrode active material is not particularly limited, and a method of forming a layer or film commonly used in the art may be used. For example, a method such as compression, coating, or deposition may be used. In addition, a case, in which a thin film of metallic lithium is formed on a metal plate by initial charging after assembling a battery without a lithium thin film in the current collector, is also comprised in the negative electrode of the present disclosure.

The electrically conductive material is a material that electrically connects the negative electrode active material and the electrolyte to serve as a path for electrons to move from the current collector to the negative electrode active material, and may be used without limitation as long as it has electrical conductivity.

For example, as the electrically conductive material, graphite such as natural graphite or artificial graphite; carbon blacks such as Super-P, Denka black, acetylene black, Ketjen black, channel black, furnace black, lamp black, and thermal black; carbon derivatives such as carbon nanotubes and fullerenes; electrically conductive fibers such as carbon fibers and metal fibers; carbon fluoride; metal powders such as aluminum and nickel powder; or electrically conductive polymers such as polyaniline, polythiophene, polyacetylene, and polypyrrole may be used alone or in combination.

The binder is to further increase the binding force between the components constituting the negative electrode and between them and the negative electrode current collector, and any binder known in the art may be used as the binder.

For example, the binder may be any one selected from fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxy propyl cellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The electrolyte contains lithium ions, and is to cause an electrochemical oxidation or reduction reaction at the positive electrode and the negative electrode through them.

As the electrolyte, all of those commonly used in a lithium secondary battery may be used.

For example, lithium salts that may be included as an electrolyte in the electrolyte may be used without limitation as long as they are commonly used in electrolyte for a lithium secondary battery. For example, the anion of the lithium salt may be any one selected from the group consisting of F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$. Specifically, the lithium salt may be LiPF$_6$, LiClO$_4$, LiAsF$_6$, LiBF$_4$, LiSbF$_6$, LiAlO$_4$, LiAlCl$_4$, LiCF$_3$SO$_3$, LiC$_4$F$_9$SO$_3$, LiN(C$_2$F$_5$SO$_3$)$_2$, LiN(C$_2$F$_5$SO$_2$)$_2$ (Lithium bis(perfluoroethylsulfonyl)imide, BETI), LiN(CF$_3$SO$_2$)$_2$ (Lithium bis(Trifluoromethanesulfonyl)imide, LiTFSI), LiN($C_aF_{2a+1}SO_2$) ($C_bF_{2b+1}SO_2$) (wherein, a and b are natural numbers, preferably $1 \le a \le 20$, $1 \le b \le 20$), lithium poly[4,4'-(hexafluoroisopropylidene)diphenoxy]sulfonylimide (LiPHFIPSI), LiCl, LiI, LiB($C_2O_4$)$_2$, LiNO$_3$, and among them, a sulfonyl group-containing imide lithium compound such as LiTFSI, BETI or LiPHFIPSI may be more preferable.

In the electrolyte used in the present disclosure, the organic solvent contained in the electrolyte may be used without limitation so long as they are conventionally used in the electrolyte solution for a lithium secondary battery. Typically, at least one selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, tetraethylene glycol dimethyl ether (TEGDME), dioxolane (DOL), dimethylsulfuroxide, acetonitrile, dimethoxyethane, diethoxyethane, vinylene carbonate, sulfolane, gamma-butyrolactone, propylene sulfite, and tetrahydrofuran, and a mixture of two or more of them, and the like can be used representatively. In particular, ethylene carbonate and propylene carbonate which are cyclic carbonates among the carbonate-based organic solvents are highly viscous organic solvents, which can be preferably used because they have a high dielectric constant and dissociate lithium salts in the electrolyte well. If such cyclic carbonates are mixed with a linear carbonate having a low viscosity and a low dielectric constant, such as dimethyl carbonate and diethyl carbonate in an appropriate ratio, an electrolyte solution having a high electrical conductivity can be made, and thus it can be used more preferably.

The electrolyte may further comprise a nitric acid or nitrous acid-based compound as an additive in addition to the lithium salt and the organic solvent described above.

The nitric acid or nitrous acid-based compound is not particularly limited in the present disclosure, but may be at least one selected from the group consisting of inorganic nitric acid or nitrous acid-based compounds such as lithium nitrate (LiNO$_3$), potassium nitrate (KNO$_3$), cesium nitrate (CsNO$_3$), barium nitrate (Ba(NO$_3$)$_2$), ammonium nitrate (NH$_4$NO$_3$), lithium nitrite (LiNO$_2$), potassium nitrite (KNO$_2$), cesium nitrite (CsNO$_2$), ammonium nitrite (NH$_4$NO$_2$); organic nitric acid or nitrous acid-based compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite; organic nitro compounds such as nitromethane, nitropropane, nitrobutane, nitrobenzene, dinitrobenzene, nitropyridine, dinitropyridine, nitrotoluene, dinitrotoluene, and combinations thereof, and preferably may be lithium nitrate.

A separator may be additionally comprised between the positive electrode and the negative electrode.

The separator separates or insulates the positive electrode and the negative electrode from each other and enables lithium ions to be transported between the positive electrode and the negative electrode, and may be made of a porous non-conductive or insulating material. The separator may be used without particular limitation as long as it is used as a separator in a typical lithium secondary battery. The separator may be an independent member such as a film and also may be a coating layer added to the positive electrode and/or the negative electrode.

As the separator, a separator with excellent impregnating ability for the electrolyte along with low resistance to ion migration in the electrolyte is preferable.

The separator may be made of a porous substrate. Any of the porous substrates can be used as long as it is a porous substrate commonly used in a secondary battery. A porous polymer film may be used alone or in the form of a laminate. For example, a non-woven fabric made of high melting point glass fibers, or polyethylene terephthalate fibers, etc. or a polyolefin-based porous membrane may be used, but is not limited thereto.

The material of the porous substrate is not particularly limited in the present disclosure, and any material can be used as long as it is a porous substrate commonly used in an electrochemical device. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenyleneoxide, polyphenylenesulfide, polyethylenenaphthalate, polytetrafluoroethylene, polyvinylidene fluoride, polyvinyl chloride, polyacrylonitrile, cellulose, nylon, poly(p-phenylene benzobisoxazole), and polyarylate.

The thickness of the porous substrate is not particularly limited, but may be 1 to 100 μm, and preferably 5 to 50 μm. Although the thickness range of the porous substrate is not particularly limited to the above-mentioned range, if the thickness is excessively thinner than the lower limit described above, mechanical properties are deteriorated and thus the separator may be easily damaged during use of the battery.

The average size and porosity of the pores present in the porous substrate are also not particularly limited, but may be 0.001 to 50 μm and 10 to 95%, respectively.

The shape of the lithium secondary battery as described above is not particularly limited and may be, for example, a jelly-roll type, a stack type, a stack-folding type (including a stack-Z-folding type), or a lamination-stacking type, and preferably a stack-folding type.

The negative electrode, the separator, and the positive electrode as described above are sequentially stacked, and the electrolyte is injecting to prepare an electrode assembly, and then the electrode assembly is placed in a battery case and sealed with a cap plate and a gasket to manufacture a lithium secondary battery.

In this case, the lithium secondary battery can be classified into various types of batteries such as lithium-sulfur secondary battery, lithium-air battery, lithium-oxide battery, and lithium all-solid-state battery depending on the type of positive electrode/negative electrode materials used, can be classified into cylindrical type, rectangular type, coin-shaped type, pouch type and the like depending on the type, and can be divided into bulk type and thin film depending on the size. The structure and preparing method of these batteries are well known in the art, and thus detailed description thereof is omitted.

In the present disclosure, since the lithium secondary battery uses a positive electrode film comprising a sulfur-carbon composite as a positive electrode, it may be a lithium-sulfur secondary battery. The lithium-sulfur secondary battery may use lithium metal as a negative electrode active material. During the discharging of the lithium-sulfur secondary battery, an oxidation reaction of lithium occurs at the negative electrode and a reduction reaction of sulfur occurs at the positive electrode. At this time, the reduced sulfur is combined with lithium ions moved from the negative electrode, is converted into lithium polysulfide, and is finally accompanied by a reaction to form lithium sulfide.

Also, the present disclosure provides a battery module comprising the lithium secondary battery described above as a unit battery.

The battery module may be used as a power source for medium- to large-sized devices requiring high temperature stability, long cycle characteristics, high-capacity characteristics, and the like.

Examples of the medium- to large-sized devices may comprise, but are not limited to, a power tool that is powered by a battery powered motor; electric cars comprising an electric vehicle (EV), a hybrid electric vehicle (HEV), a plug-in hybrid electric vehicle (PHEV), and the like; an electric motorcycle comprising an electric bike (E-bike) and an electric scooter (E-scooter); an electric golf cart; and a power storage system.

In addition, the present disclosure provides a battery pack comprising the battery module.

The battery pack is characterized in that it comprises the battery module, and configurations other than the above characteristics may be employed without limitation of configurations known in this field.

Hereinafter, preferred examples of the present disclosure will be described in order to facilitate understanding of the present disclosure. It will be apparent to those skilled in the art, however, that the following examples are illustrative of the present disclosure and that various changes and modifications can be made within the scope and spirit of the present disclosure, and also it is natural that such variations and modifications are within the scope of the appended claims.

Preparation Example 1: Preparation of Sulfur-Carbon Composite

Sulfur (S) and carbon nanotubes (CNT) were uniformly mixed in a solid state in a weight ratio of 7:3, and then ball-milled at 100 rpm for 1 hour to prepare a mixture.

The mixture was heat-treated at 155° C. for 35 minutes to allow sulfur to be loaded into the pores of CNTs and to be coated on the surface to prepare a sulfur-carbon composite (S-CNT). In this case, the CNTs having a specific surface area of 350 $m^2/g$ were used.

Example and Comparative Example

Example 1

The sulfur-carbon composite (S-CNT) of Preparation Example 1 was supplied to the upper surface of the mold after large powder was removed using an ultrasonic sieving machine (Telesonic company).

The scraping blade was positioned at a distance of 1000 μm based on the upper surface of the mold, and then driven in the transport direction to remove the excess sulfur-carbon composite of Preparation Example 1 above. After that, while lowering the height of the scraping blade by every 20 μm, flattening was performed by repeating 10 times in the direction opposite to the conveying direction and in the conveying direction to form a positive electrode material having a thickness of 800 μm.

The positive electrode material passed through the flattening step was transferred to the forming part, and then, a pressure of 1 MPa was applied for 5 seconds to prepare a free-standing film positive electrode.

Example 2

The sulfur-carbon composite (S-CNT) of Preparation Example 1 was supplied to the upper surface of the mold after large powder was removed using an ultrasonic sieving machine (Telesonic company).

The scraping blade was positioned at a distance of 1000 μm based on the upper surface of the mold, and then driven in the transport direction to remove the excess sulfur-carbon composite of Preparation Example 1. After that, the height of the scraping blade was lowered by 200 μm, and then flattening was performed by repeating 1 time to form a positive electrode material having a thickness of 800 μm.

The positive electrode material passed through the flattening step was transferred to the forming part, and then, a pressure of 1 MPa was applied for 5 seconds to prepare a free-standing film positive electrode.

Comparative Example 1

The sulfur-carbon composite (S-CNT) of Preparation Example 1 was supplied to the upper surface of the mold after large powder was removed using an ultrasonic sieving machine (Telesonic company).

The upper surface of the mold supplied with the sulfur-carbon composite of Preparation Example 1 was transferred to the forming part, and then, a pressure of 1 MPa was applied for 5 seconds to prepare a positive electrode film.

Experimental Example 1: Surface Evaluation

The surface of the positive electrode material after flattening in Example 2 was visually evaluated. The results obtained at this time are shown in FIG. 2.

As shown in FIG. 2, it can be seen that during the flattening process of the positive electrode material, if there is a large change in the height of the scraping blade, the positive electrode material in a powder state is accumulated on the scraping blade, and a part of the positive electrode material located in the traveling direction of the scraping blade is removed together, and thus non-uniform filling pattern appears.

DESCRIPTION OF REFERENCE NUMERALS

100: apparatus for manufacturing a positive electrode film
110: conveying means
120: feeding part
130: flattening part
131: scraping blade
140: forming part
150: conveying part

The invention claimed is:

1. An apparatus for manufacturing a positive electrode film, the apparatus comprising:
   a feeding part supplying a positive electrode material in a powder state to an upper surface of a mold conveyed by conveying means;
   a flattening part flattening the positive electrode material supplied to the upper surface of the mold;
   a forming part applying pressure from an upper direction to the positive electrode material that has passed through the flattening part; and
   a conveying part comprising the conveying means sequentially conveying the mold to the feeding part, the flattening part, and the forming part,
   wherein the flattening part includes a scraping blade flattening an upper surface of the positive electrode material, wherein the scraping blade comprises:
a first scraping blade flattening the upper surface of the positive electrode material in a direction opposite to a conveying direction, or flattening by reciprocating once or more in the direction opposite to the conveying direction and in the conveying direction; and
a second scraping blade flattening the upper surface of the positive electrode material once in a direction different from the conveying direction and the direction opposite to the conveying direction, or flattening by reciprocating twice or more in the direction different from the conveying direction and the direction opposite to the conveying direction, and
wherein the forming part comprises a pressure plate.

2. The apparatus according to claim 1, wherein the positive electrode material in a powder state comprises a sulfur-carbon composite composed of 50% by weight to 90% by weight of sulfur and 20% by weight to 10% by weight of a porous carbon material.

3. The apparatus according to claim 1, wherein the positive electrode material in a powder state comprises 90 to 100% by weight of sulfur-carbon composite based on the total weight of the positive electrode material.

4. The apparatus according to claim 1, wherein an internal adhesive force of the positive electrode material in a powder state is 10 gf/cm or more.

5. The apparatus according to claim 1, wherein the direction different from the conveying direction and the direction opposite to the conveying direction is a direction that is at an angle of 90° to the conveying direction and the direction opposite to the conveying direction.

6. The apparatus according to claim 1, wherein the positive electrode film is a free-standing film positive electrode.

7. A method of manufacturing a positive electrode film using the apparatus according to claim 1, the method comprising:
(a) supplying the positive electrode material in a powder state to the upper surface of the mold conveyed by the conveying means;
(b) flattening the upper surface of the positive electrode material supplied to the upper surface of the mold using the flattening part; and
(c) applying the pressure to the positive electrode material flattened through step (b) from the upper direction using the forming part.

8. The method according to claim 7, wherein the positive electrode material in a powder state contains sulfur-carbon composite.

9. The method according to claim 7, wherein the step (b) is repeated until a desired loading amount of the positive electrode material in a powder state.

10. The method according to claim 7, wherein the pressure of step (c) is from 0.2 to 5 MPa.

11. The method according to claim 7, wherein the pressure in step (c) is applied to the positive electrode material for 1 to 10 seconds.

12. The method according to claim 7, wherein the positive electrode film is a free-standing film positive electrode.

* * * * *